(12) United States Patent
Kustanowitz (10) Patent No.: US 9,640,074 B2
(45) Date of Patent: May 2, 2017

(54) PERMISSIONS-BASED TRACKING OF VEHICLE POSITIONS AND ARRIVAL TIMES

(71) Applicant: BusWhere LLC, Chevy Chase, MD (US)

(72) Inventor: Jacob D. Kustanowitz, Boca Raton, FL (US)

(73) Assignee: BUSWHERE LLC, Chevy Chase, MD (US)

( * ) Notice: Subject to any disclaimer, the term of this patent is extended or adjusted under 35 U.S.C. 154(b) by 127 days.

(21) Appl. No.: 14/570,646

(22) Filed: Dec. 15, 2014

(65) Prior Publication Data

US 2015/0168168 A1     Jun. 18, 2015

Related U.S. Application Data

(60) Provisional application No. 61/916,306, filed on Dec. 16, 2013.

(51) Int. Cl.

| | |
|---|---|
| G08B 1/08 | (2006.01) |
| G08G 1/123 | (2006.01) |
| G01S 5/00 | (2006.01) |
| G01S 5/02 | (2010.01) |
| G06Q 10/08 | (2012.01) |
| G06Q 50/30 | (2012.01) |

(52) U.S. Cl.
CPC ............ *G08G 1/123* (2013.01); *G01S 5/0027* (2013.01); *G01S 5/02* (2013.01); *G06Q 10/0833* (2013.01); *G06Q 50/30* (2013.01)

(58) Field of Classification Search
CPC ....... G01S 5/02; G06Q 10/0833; G06Q 50/30

USPC ..................... 340/539.13; 701/410
See application file for complete search history.

(56) References Cited

U.S. PATENT DOCUMENTS

| | | | | |
|---|---|---|---|---|
| 2002/0099500 | A1* | 7/2002 | Schmier ................. | G08G 1/123 701/532 |
| 2006/0270421 | A1* | 11/2006 | Phillips .............. | G08B 21/0236 455/457 |
| 2007/0024440 | A1* | 2/2007 | Moran ................... | G08G 1/127 340/539.13 |

OTHER PUBLICATIONS

"www.wmata.com/rider_tools/nextbus.arrivals.cfm", printed from web.archive.org on Mar. 23, 2015, archived Nov. 7, 2014 (24 pages).

* cited by examiner

*Primary Examiner* — Adam Tissot
(74) *Attorney, Agent, or Firm* — DLA Piper LLP (US)

(57) ABSTRACT

Systems and methods for tracking a vehicle may use a mobile device associated with a tracking account, a server, and one or more client devices associated with one or more users. The mobile device may be configured to receive a location update from a location service and transmit data associated with the location update over a network. The server may be configured to receive the data associated with the location update from the mobile device, map the location update to a predefined route comprising one or more predefined stops to generate a route update, and transmit data associated with the route update over a network. The one or more client devices may be configured to receive the data associated with the route update from the sever. Access to the route update may be limited to a pre-authorized set of the one or more users associated with the tracking account.

26 Claims, 9 Drawing Sheets

PERMISSIONS-BASED TRACKING OF VEHICLE POSITIONS AND ARRIVAL TIMES

CROSS-REFERENCE TO RELATED APPLICATION

This application is based on and derives the benefit of the filing date of U.S. Provisional Patent Application No. 61/916,306, filed Dec. 16, 2013, the entirety of which is incorporated by reference herein.

BACKGROUND

Asset tracking systems use global positioning system (GPS), cellular triangulation, and/or other methods to locate and track assets such as vehicles. Many off-the-shelf devices, such as smartphones, are equipped with hardware and/or software that enables locating and tracking of the devices. Such location and tracking may be done to facilitate emergency responses or to locate and protect business assets, for example.

DETAILED DESCRIPTION OF SEVERAL EMBODIMENTS

Systems and methods described herein may be used to track vehicles as they travel predefined routes. These systems and methods may be used by administrators and consumers of a fleet of vehicles, for example, in which a preselected group of users desire to have real-time information about the positions of fleet vehicles and the estimated times of arrival at given locations along a defined route. A sensor/transmitter on the vehicle may detect a location and send the location information to a server. The server may push the information to authenticated listeners along with estimated arrival times and/or other information about the vehicle. Some embodiments may push the information to commercially available mobile phones on a widely used operating system such as Android OS or iOS (belonging to the administrator or acquired in bulk for this purpose) associated with a given route by the administrator. This may enable self-service registration for the tracking system without expensive and custom hardware. Other embodiments may include customized hardware solutions. Estimated arrival times may be calculated using definitions of predefined routes and stops to determine how long a vehicle may take to arrive at a point of interest from its present location. These routes and stops may be input directly by an administrator or may be implicitly defined ("discovered") in some embodiments. Once configured, the system may let registered users log in from a computer or mobile device, see the entire route and bus position on a map, estimated arrival times at various locations, and register to receive automated updates as the vehicle proceeds along the route, for example.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). Connections between computers may use any protocols, including connection-oriented protocols such as TCP or connectionless protocols such as UDP. Any connection through which at least two computers may exchange data can be the basis of a network.

Figure 1:
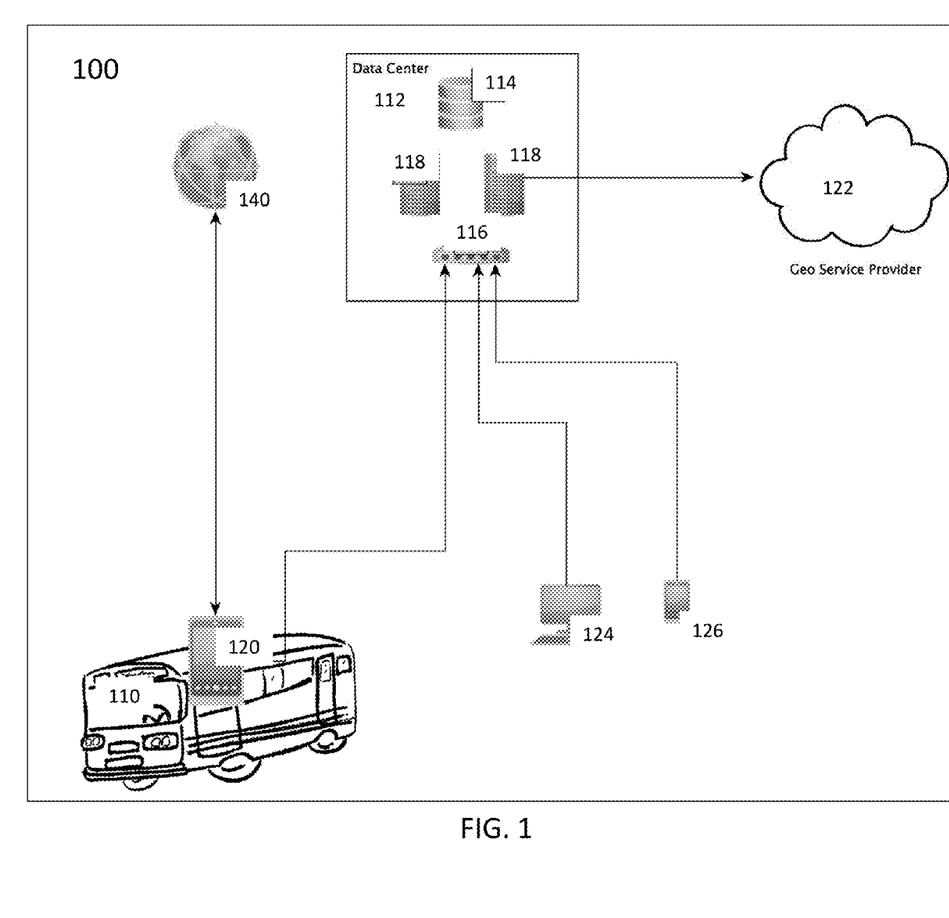
FIG. 1 is a tracking network according to an embodiment of the invention.

FIG. 1 is a tracking network 100 according to an embodiment of the invention. A vehicle 110, such as a bus, may include a device 120 equipped with tracking capabilities such as a GPS receiver and associated hardware and/or software. One or more devices 120 may be registered with a data center 112. For example, each bus in a fleet may have a registered device 120. One or more routes may be defined for each device 120. A route may include one or more stops as well as optional start and end times for the route. A route may be defined by an administrator or other user, or may be learned by observing the vehicle 110 as described below. In some embodiments, the device 120 may be a device 120 belonging to a member of the organization (e.g., a bus driver's personal smartphone), a spare device 120 (e.g., a smartphone) that the organization already owns, an inexpensive device 120 acquired for tracking purposes, or a device 120 provisioned by a service provider (e.g., a provider of location tracking services). If a dedicated device 120 is being used, an administrator may install the device 120 in the vehicle 110, connecting the device 120 to the vehicle's power to conserve battery in some embodiments.

While the vehicle 110 is traveling, the device 120 may continually receive position updates from a position service 140, such as GPS, Wi-Fi, cellular towers, etc. As position updates are received, the device 120 may send the updated location data to the data center 112. For example, the data center 112 may include a router 116 directing network traffic to one or more servers 118 supported by one or more databases 114. Those of ordinary skill in the art will appreciate that the data center 112 may include any arrangement of one or more computers.

An administrator or other users may configure a set of users associated with client devices and define route-by-route permissions for each user. Each user may be sent an invitation that authorizes access. A user may use the invitation to create an account that has access to the predefined route(s). The clients may be any devices capable of data communication, for example computers 124 with web browsers or mobile devices (e.g., smartphones or tablets) 126 with web browsers or apps. The client 124, 126 may receive updates from the server 118 (either by "pull" (periodic requests for data) or "push" (for example, an open socket connection that may let the server 118 send updates to the client 124, 126 as they occur). The client 124, 126 may display information about the vehicle's 110 location and/or other parameters (e.g. speed, direction, etc.) to registered users. A user may log into the system using a client 124, 126 and may receive the relevant information. Multiple users and multiple clients 124, 126 may be able to receive information about one or more devices 120 if they have permission. In some embodiments, a call may be made to a third party provider capable of converting coordinates to addresses and vice versa, and capable of providing estimated arrival times, possibly accounting for current traffic, weather, and other conditions. This call may be made either from the server 118 before the information is sent to the client 124, 126 or from the individual client 124, 126. The call can be done on-demand or at predefined intervals or points in time. In some embodiments, the server 118 and/or the client 124, 126 may be able to convert the coordinates and estimate arrival times.

Figure 2:
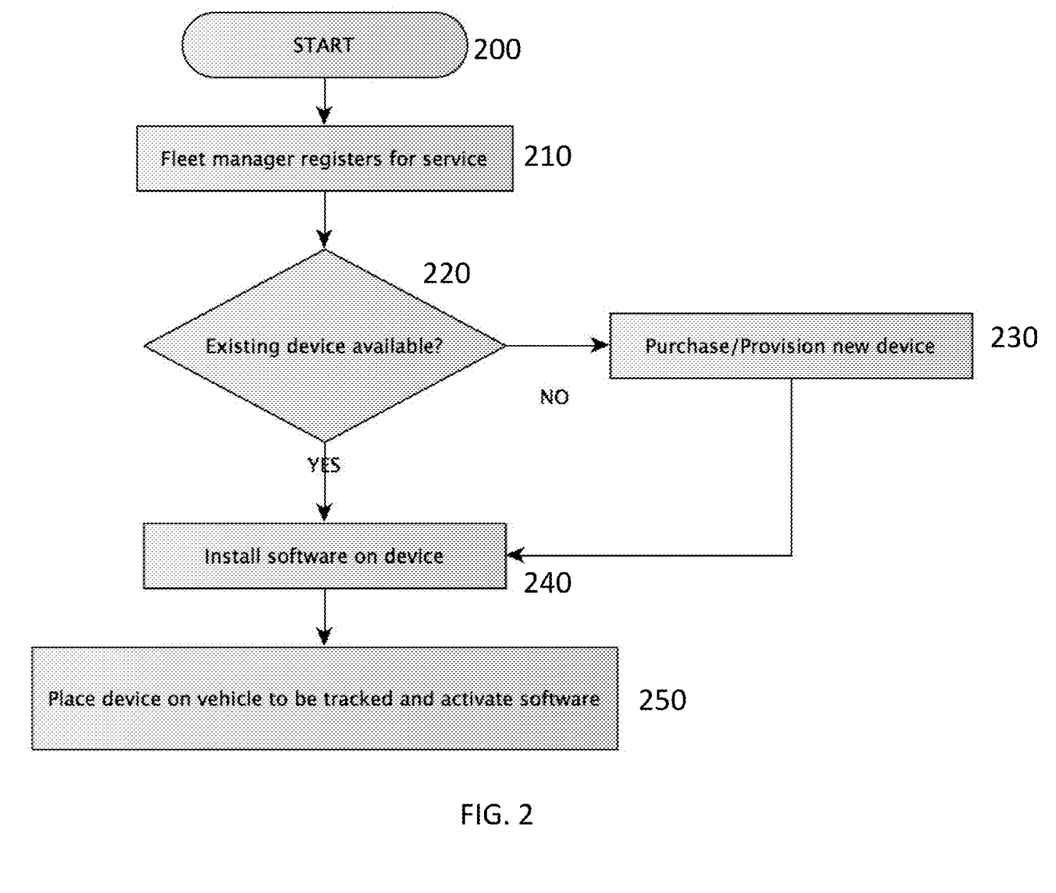
FIG. 2 is a setup process according to an embodiment of the invention.
Figure 3A:
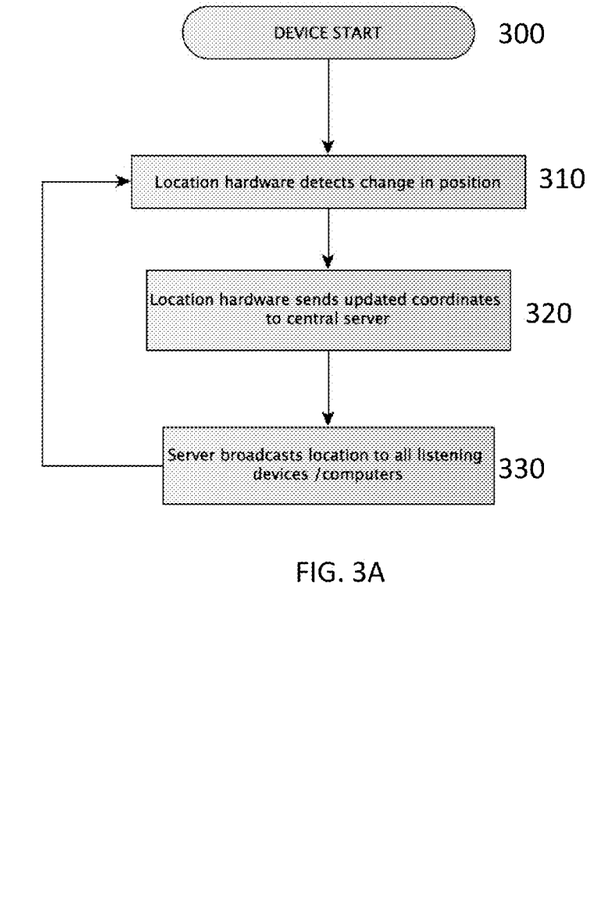
FIG. 3A is a device/server operation process according to an embodiment of the invention.
Figure 3B:
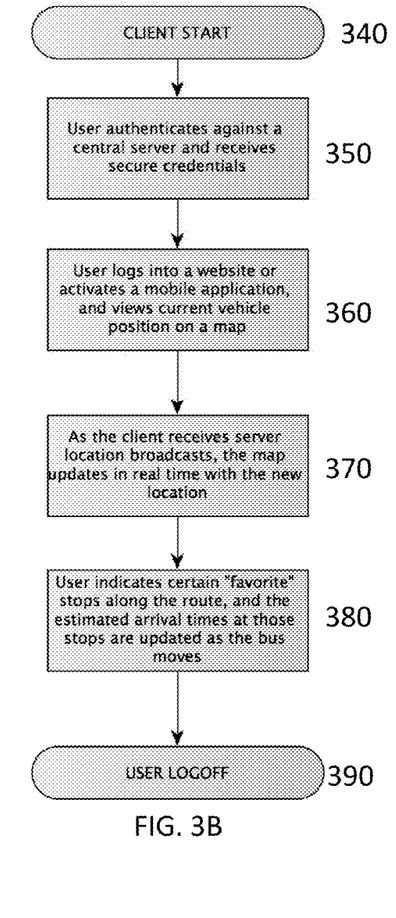
FIG. 3B is a client operation process according to an embodiment of the invention.
Figure 4:
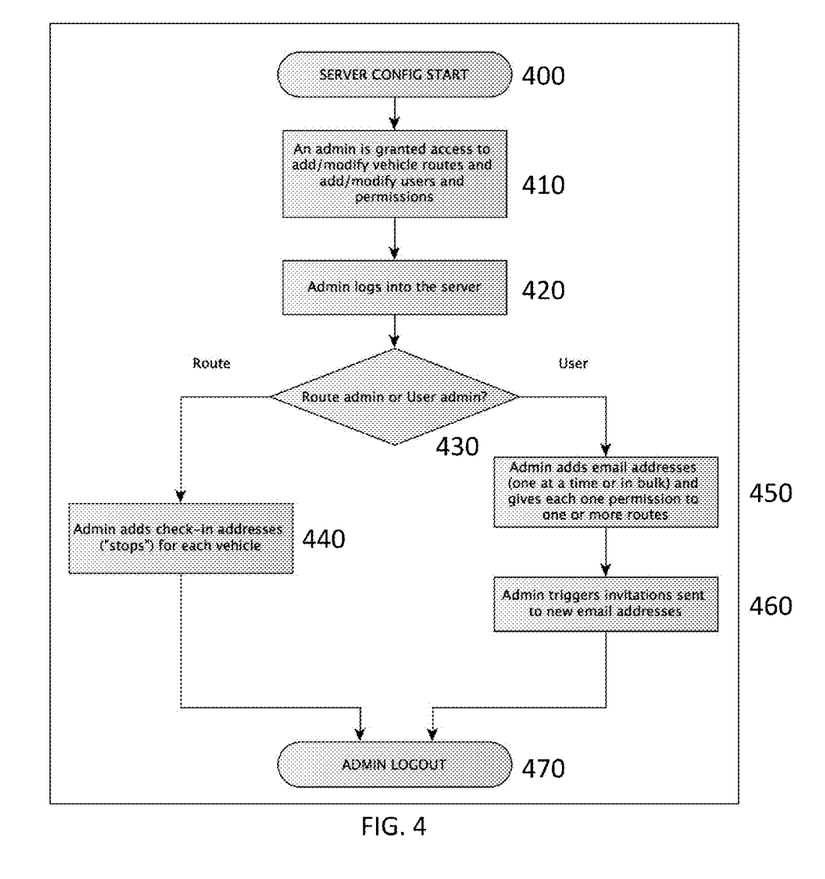
FIG. 4 is a server operation process according to an embodiment of the invention.

FIGS. 2-4 illustrate processes which may be performed by the server 118 and/or the client 124, 126 to facilitate the vehicle 110 tracking described above.

FIG. 2 is a setup process 200 according to an embodiment of the invention. By performing this process 200, a fleet manager may acquire and manage the tracking device 120. Since the device 120 may include generic hardware and software, the manager may already have a device 120 that could provide the needed services, or could be given a device 120 by a service provider. In 210, a registration request may be sent to the server 118. This request may register a specific vehicle 110 for tracking. In 220, it may be determined whether the vehicle 110 will be tracked with an existing device 120. If not, in 230 a new device 120 may be provisioned, which may include making any configuration changes on the device 120 that may allow the device 120 to receive and report position updates (e.g., enabling a GPS receiver and data transceiver, for example). In 240, software may be installed on the device 120 that that may allow the device 120 to receive and report position updates. In 250, the device 120 may be placed on the vehicle 110 to be tracked and activated.

FIG. 3A is a device/server operation process 300 according to an embodiment of the invention. In 310, the device 120 may receive location updates via a position service (e.g., GPS, cell networks, Wi-Fi routers, etc.). In 320, the device 120 may send the position data to the server 118. This position data may be sent at given intervals which may be established based on a desired precision. For example, the more precisely a vehicle's 110 position is to be tracked, the shorter the intervals. In 330, the server 118 may broadcast the location data to the client 124, 126. This process 300 may repeat periodically while a vehicle 110 is active.

FIG. 3B is a client operation process 340 according to an embodiment of the invention. In 350, an end user may log into a client app (e.g., a user interface running in a web browser, on a mobile device, or other computer) of the client 124, 126, which may send the user's authenticated identity to the server 118. As noted above, the server 118 may broadcast the vehicle's 110 current location (or the client 124, 126 may poll for the vehicle's 110 current location) to all authenticated listening devices (e.g., the client 124, 126). In 360, current vehicle 110 position derived from this data may be displayed to the user in the client app. As the vehicle 110 operates, new location data is continuously generated and broadcast to the client 124, 126. Thus, in 370, as this new data is received by the client 124, 126, vehicle 110 location updates may be displayed to the user. These updates may include updated arrival time estimates at one or more stops. The server 118 may generate data about the arrival times by monitoring the progress of the device 120 and determining which route it is on. For example, the device 120 may proceed along a predefined bus route and stop at known stops. Therefore, the server 118 may know that the device 120 is being used on the predefined route. The route may also include a waypoint that is unique to that route (e.g., a location that no other route uses). When the device 120 reaches the waypoint, the server 118 may know that the device is being used on the predefined route. The stops may include a next stop and/or "favorite" stops which may have been pre-programmed or selected by the user, for example. In 380, the user may input favorite stops so that future updates will include vehicle 110 arrival estimates related to these stops. The vehicle 110 location data may be periodically updated and displayed to the user until the user logs off in 390. The client 124, 126 user interface may allow a user to share updates about position, arrival time, and other vehicle information with other users (e.g., other registered users having permission to view such data) in a peer-to-peer fashion.

FIG. 4 is a server operation process 400 according to an embodiment of the invention. This process 400 may allow an admin to configure vehicle 110 routes with predefined stops and define users and the routes that they are allowed to see. In 410, an admin may be granted access to the system, for example by registering with the server 118. In 420, the admin may log into the server 118 locally or via a remote client. In 430, the server 118 may receive a selection of whether route or user data is to be viewed and/or edited. In some cases, an admin may only be allowed to access routes or users but not both, or may only be allowed to view but not edit data, depending on permissions granted to the specific admin. If routes are to be modified, in 440 the server 118 may receive additions and/or changes to vehicle 110 routes from the admin. If users are to be modified, in 450 the server 118 may receive user data such as user email or other identifying information and permissions associated with the user. The permissions may define which routes a user may view using a client 124, 126 as described above. When new users are registered and/or when user data is modified, in 460 the server 118 may send invitations to the new or modified users, for example via email. In 470, the admin may log out of the server 118.

Figure 5A:
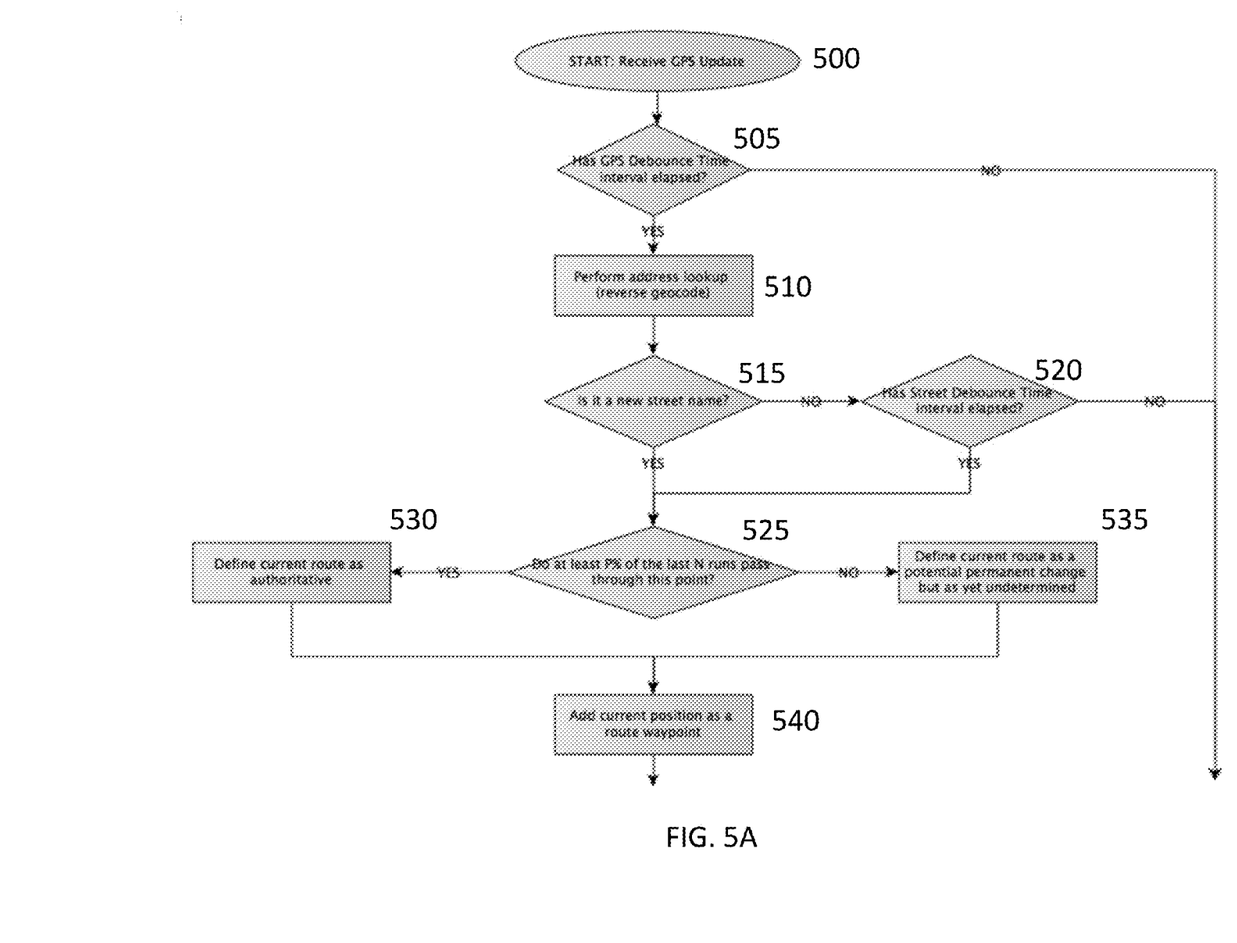
FIGS. 5A-5B are a route and stop discovery process according to an embodiment of the invention.
Figure 5B:
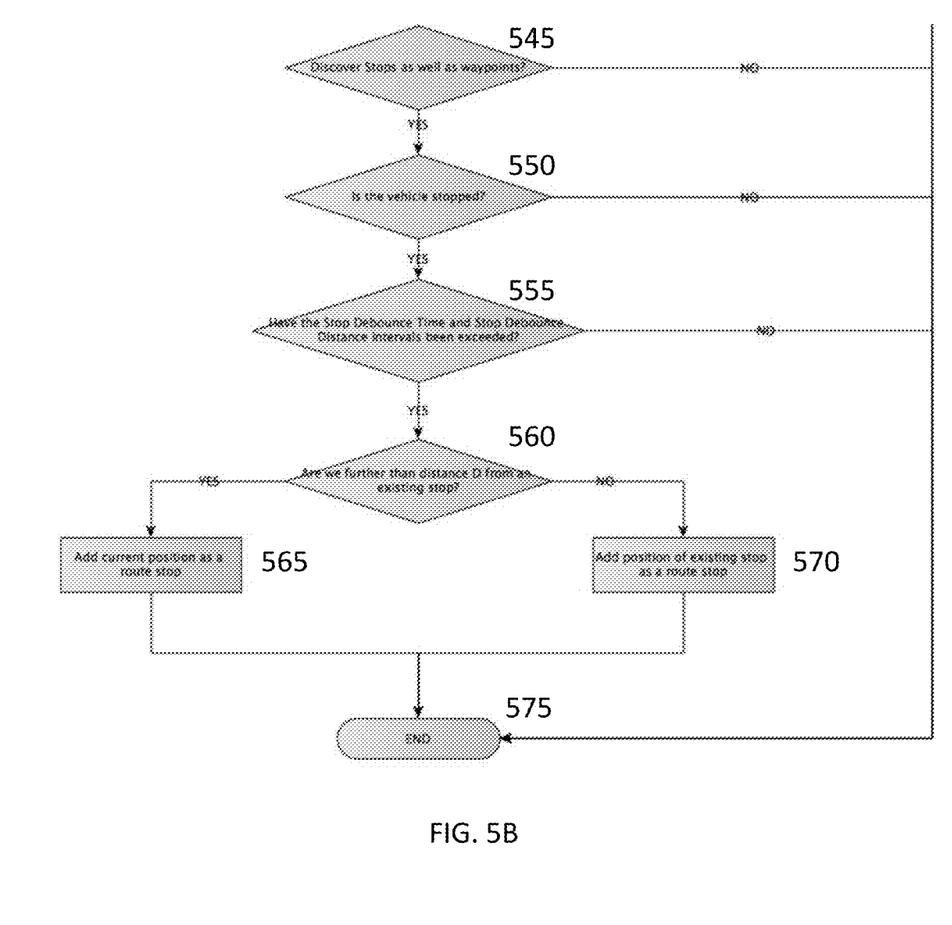

In some embodiments, routes may be automatically discovered based on the vehicle 110 location data. This may be done instead of or in addition to receiving routes defined by an admin as described above. FIGS. 5A-5B are a route and stop discovery process 500 according to an embodiment of the invention. This process 500 may allow the route and stops therein to be "discovered" automatically and implicitly by tracking the vehicle 110 as it drives substantially the same route some number of times. Some or all of the steps of this process 500 may be performed each time a location update is received from a device 120 at the server 118. Note that while in the following example, the process 500 is performed by the server 118, some or all of the steps of this process 500 may be performed by other elements of the data center 112 or other computers external to the data center 112. This process 500 may be activated and deactivated by an admin for a specific device 120. For example, a device 120 may be tagged as being in learning mode, and while the device 120 is in learning mode, data received from the device 120 may be used to learn a route. The device 120 may be taken out of learning mode after the route is learned.

When a location update is received, in 505 the server 118 determined whether a GPS debounce time interval has elapsed. GPS debounce time may be a number of seconds X such that when the number of seconds is less than X, the reading from the device 120 may be ignored. Thus, if a location update is received, and the GPS debounce time interval has not elapsed, the process 500 may end 575. In one example, the GPS debounce time may be set for 10 seconds, although other values may be possible.

If the GPS debounce time interval has elapsed, in 510 the server 118 may perform an address lookup, for example using a reverse geocode system. The server 118 may query a database using the GPS coordinates reported by the device 120 to identify a nearest street address to the position of the device 120. In 515, the server 118 may determine whether the identified street name from the address lookup is a new street name (i.e., the vehicle 110 is on a new street compared to the street from the most recent previously reported and analyzed data). If it is not a new street, in 520 the server 118 may check whether a street debounce time interval has elapsed. Street debounce time may be a number of seconds Y between readings on the same street such that when the number of seconds is less than Y, a new waypoint is not added to the route. Thus, if a location update is received having the same street information as a previous location update, and the street debounce time interval has not elapsed, the process 500 may end 575.

If the street debounce time has elapsed, in 525 the server 118 may determine whether at least P % of the last N runs by the vehicle 110 have passed through the location defined by the received data. P % may be the percentage of the previous runs that have to pass through the proposed waypoint such that if P>Z, the waypoint may be considered to be on the authoritative route. For example, Z may be set to 50, so that a waypoint is only added after 50% of recorded runs pass the same waypoint, although other values of Z may be possible. N may be a number of previous routes tracked. For example, with P=50 and N=3, if a driver takes a new route at least twice in a row, the new route may be considered authoritative. Thus, if P is greater than Z, in 530 the server 118 may define the new route as authoritative. If P is less than or equal to Z, in 535 the server 118 may define the new route as a potential permanent route, but as yet undetermined. As the vehicle 110 is tracked over time, the route may eventually become authoritative or may be discarded. In 540, the current position may be added as a route waypoint.

If stops are not to be discovered as well as waypoints 545, the analysis may end 545. If stops are to be discovered, in 550 the server 118 may determine whether the vehicle 110 is stopped. This may be determined based on whether the current position data is different from the most recently reported previous position data. If the vehicle 110 is not stopped, the analysis may end 545. If the vehicle 110 is stopped, in 555 the server 118 may determine whether the stop debounce time and stop debounce distance intervals have been exceeded. Stop debounce time may be a number of seconds A such that if the vehicle 110 stops within A seconds of the last stop, the stop is not considered a real stop (for example, the stop may indicate the vehicle 110 is stuck in stop and go traffic). Stop debounce distance may be the number of meters B such that if the vehicle stops within B meters of the last stop, the stop is not considered a real stop. If one or both of these values are not exceeded, the analysis may end 575. If both of these values are exceeded, in 560 the server 118 may determine whether the vehicle 110 is further than D distance from an existing stop on the route. D may be a distance from an existing stop (e.g., a previously entered or determined stop on the route) such that >D, the current position may be regarded as a stop. Otherwise, an existing stop may be maintained and the current position may not be recorded as a stop. This may help keep routes stable.

Figure 6:
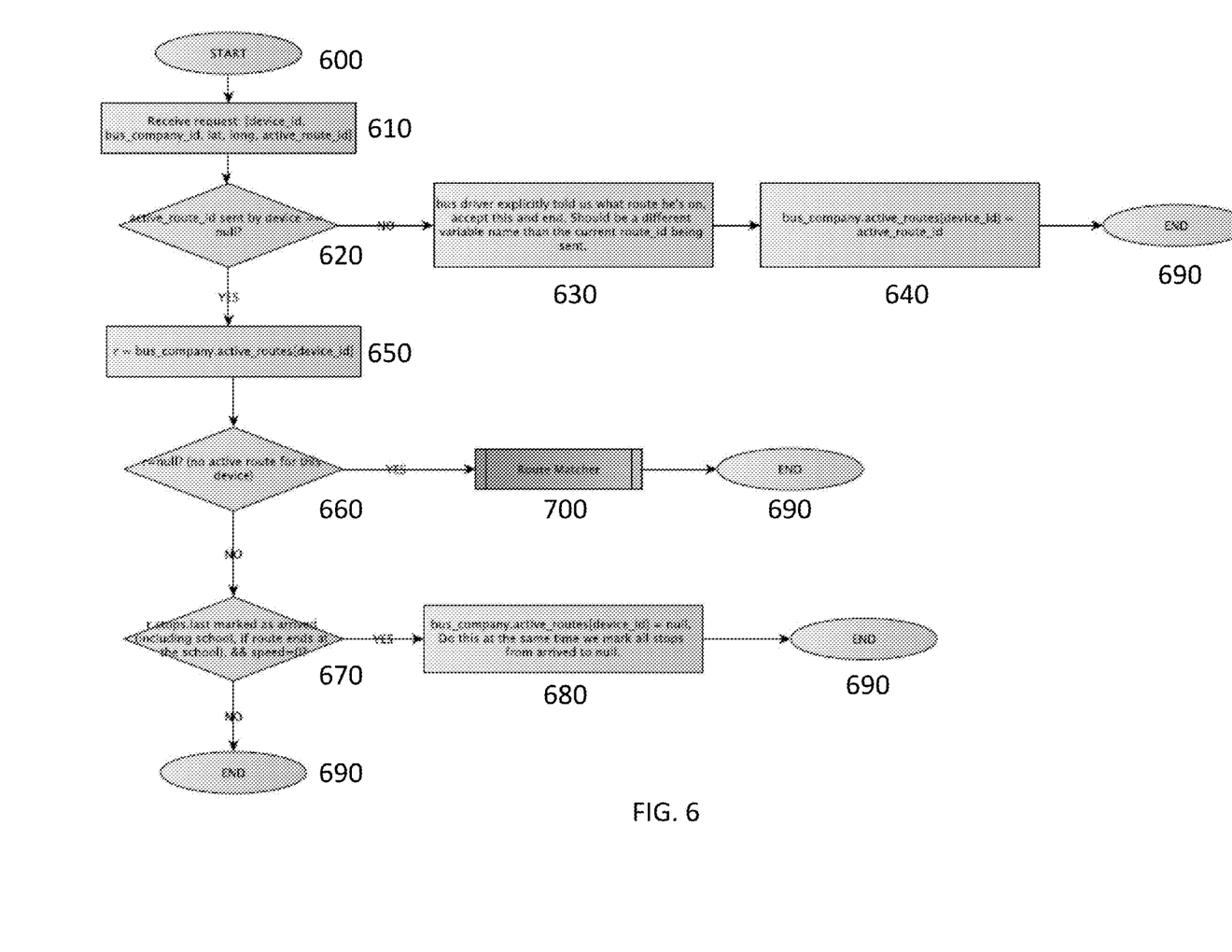
FIG. 6 is a route identifying process according to an embodiment of the invention.
Figure 7A:
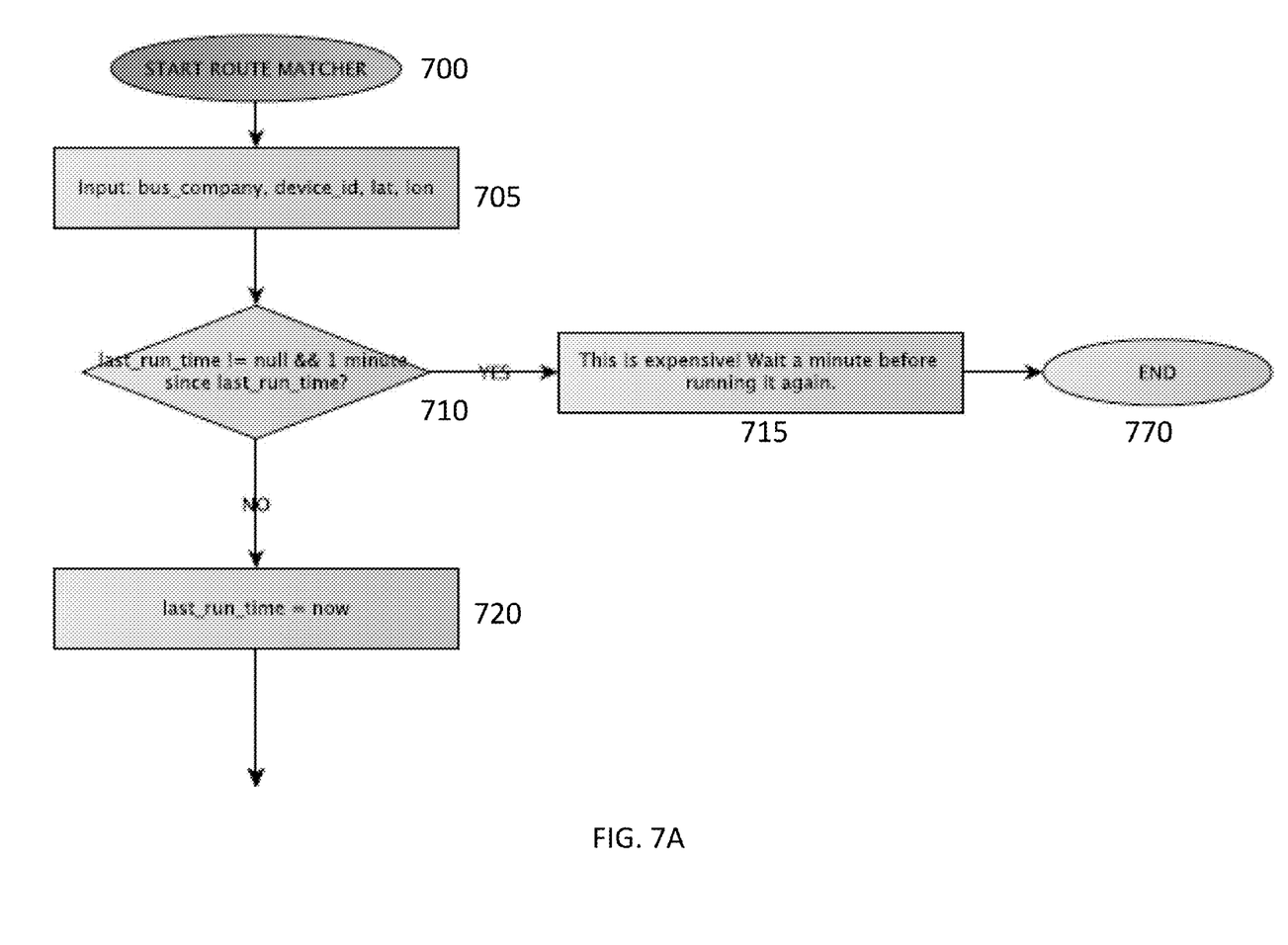
FIGS. 7A-7B are a route matching process according to an embodiment of the invention.
Figure 7B:
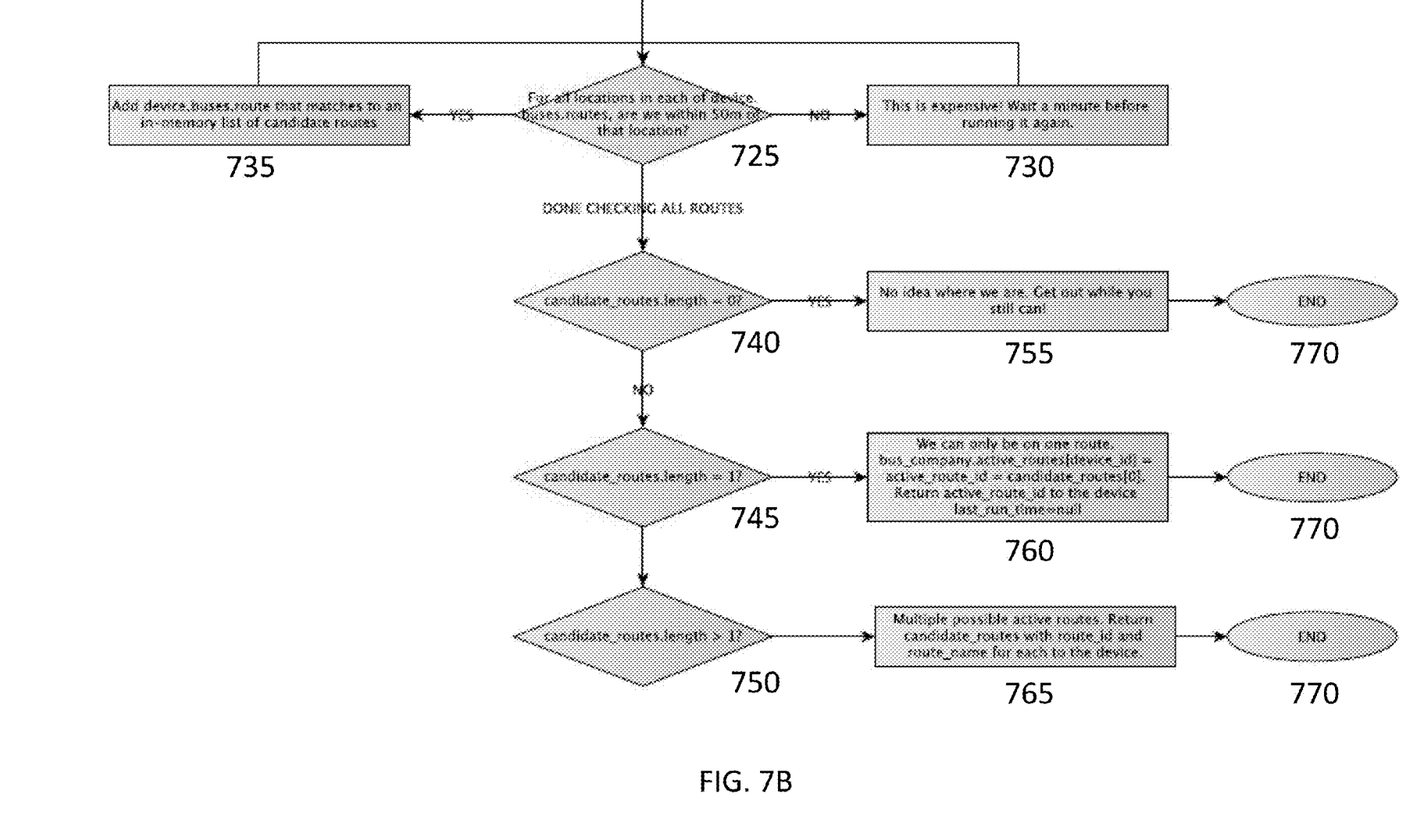

In some embodiments, a device 120 may be able to automatically identify which route the vehicle 110 is on, or the server 118 may be able to identify the route based on the information sent by the device 120 and transmit information about the identified route back to the device 120. The device 120 in these embodiments may not be explicitly associated with a single route. Instead it may be on a vehicle 110 whose route may be initially unknown and may be detected. Note that while the route identification processes 600, 700 are described as being performed by the server 118 below, in some embodiments, other computers (e.g., the device 120) may perform some or all actions within these processes.

FIG. 6 is a route identifying process 600 according to an embodiment of the invention. In 610, the server 118 may receive location data from the device 120 as discussed above and may also receive data identifying the device 120. The device 120 may also send a vehicle 110 identity, or the identity of the vehicle 110 may be determined from the identity of the device 120. In 620, the device 120 may also send an identification of its current route, for example a route entered by the operator of the device 120. If this identification is sent, in 630 the server 118 may accept this information and, in 640, may assign the identified route to the device 120. The process 600 may end 690 at this point. If the device 120 does not send a route identification, in 650 the server 118 may check whether a route has been assigned to the device 120 previously. If not, in 660 the server 118 may determine that no route is known for the device, and the route matching process 700 described below may be employed to identify the route. Once the route is identified, the process 600 may end. If a route has been assigned, in 670 the server 118 may determine whether the route is still in progress based on the location data reported by the device. If so, the process 600 may end 690. If not (e.g., if the route has been completed), the server 118 may reset the route data (e.g., mark all stops from "arrived" to "null", indicating that the route is over and the next time the route is followed, each stop must be revisited). Then the process 600 may end.

FIGS. 7A-7B are a route matching process 700 according to an embodiment of the invention. When the route for a device 120 is not known, this process 700 may identify the route by comparing the location data reported by the device 120 with location information for one or more possible routes. In 705, the device 120 identity, location, and, in some cases, vehicle 110 identity may be received. In 710, the server 118 may determine whether the route matching process 700 has been run for the device 120 recently, for example less than one minute ago (although other times may be possible). If it has been less than the allowed time, in 715 the server 118 may refuse to match the route until the time has elapsed, and the route matching process 700 may end. The route matching process 700 may be retried the next time the device 120 reports a location, and when the appropriate time has elapsed, it may be allowed to proceed.

If the process 700 is allowed to proceed, in 720 the server 118 may set the most recent run time to the present time to reset the timer. In 725, the server 118 may check each route to see if it includes a location within the route within some distance (e.g., 50 m, though other distances may be possible) from the device 120 location. If a route does not fall within the prescribed distance, in 730 the server 118 may wait some time (e.g., a minute, though other times may be possible) before trying the next route. If a route falls within the prescribed distance, in 735 the route may be added to a list of potential candidate routes. When a list has been generated, in 740-750 the server 118 may determine whether 0, 1, or more than 1 routes are candidates. If no routes are candidates, in 755 the server 118 may determine that the route cannot be identified. A message may be sent to the device 120, and a device 120 operator may be able to enter a route which may then become the route for the device 120. If one route is a candidate, in 760 the server 118 may assign this route to the device 120, and a device 120 operator may be able to confirm this assignment. If there are multiple candidate routes, in 765 the server 118 may send information identifying the candidate routes to the device 120, and the device 120 operator may be able to choose from among these candidates to specify the correct route. In some embodiments, the multiple route scenario may be handled similarly to the zero route scenario, and a user may enter the route without being presented with the list of candidates. After the route is identified, the process 700 may end 770.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

I claim:

1. A system for tracking a vehicle selected from a plurality of vehicles comprising:
    a mobile device associated with a tracking account and the vehicle, the mobile device being configured to receive a location update from a location service and transmit data associated with the location update over a network;
    a server configured to:
        receive the data associated with the location update from the mobile device,
        determine a route for the mobile device from the data associated with the location update by comparing the location update to a plurality of possible predefined routes to identify one or more candidate routes comprising a location similar to the location update and assigning one of the candidate routes as the assigned route for the mobile device,
        generate a route update using the assigned route and the location update, and
        transmit data associated with the route update over a network; and
    one or more client devices associated with one or more users, the one or more client devices being configured to receive the data associated with the route update from the sever, wherein access to the data associated with the route update is limited to a pre-authorized subset of the one or more users associated with the tracking account, the subset of the one or more users being authorized to access data for the assigned route and the vehicle and restricted from accessing data for at least one other route and/or vehicle.

2. The system of claim 1, wherein the assigned route comprises two or more predefined stops.

3. The system of claim 1, further comprising a processor configured to implicitly define the assigned route by:
    receiving a plurality of the location updates from the mobile device; and
    recording the assigned route based on the plurality of location updates.

4. The system of claim 3, wherein the assigned route is recorded based on the mobile device's motion patterns over a period of time.

5. The system of claim 4, wherein the mobile device's motion patterns are determined using a set of the plurality of the location updates received at least a first time interval apart from one another.

6. The system of claim 4, wherein the mobile device's motion patterns are determined using a set of the plurality of the location updates determined to be on different streets from one another.

7. The system of claim 3, wherein the assigned route is recorded based on the mobile device's stopping patterns over a period of time.

8. The system of claim 7, wherein the mobile device's stopping patterns are determined using a set of the plurality of the location updates received at least a second time interval apart from one another.

9. The system of claim 7, wherein the mobile device's stopping patterns are determined using a set of the plurality of the location determined to be at least a first distance from one another.

10. The system of claim 1, wherein the one or more client devices or the server is further configured to send a request to a provider to translate the location update into an estimated time of arrival at a location for the mobile device and receive the estimated time of arrival.

11. The system of claim 10, wherein the location is one of at least one user defined favorite locations.

12. The system of claim 10, wherein the one or more client devices are further configured to share data associated with the location update, the route update, and/or the estimated time of arrival with at least one other one of the one or more client devices over a network.

13. A method for tracking a vehicle selected from a plurality of vehicles comprising:

receiving, with a mobile device associated with a tracking account and the vehicle, a location update from a location service;

transmitting, with the mobile device, data associated with the location update over a network;

receiving, with a server, the data associated with the location update from the mobile device;

determining, with the server, a route for the mobile device from the data associated with the location update by comparing the location update to a plurality of possible predefined routes to identify one or more candidate routes comprising a location similar to the location update and assigning one of the candidate routes as the assigned route for the mobile device;

generating, with the server, a route update using the assigned route and the location update;

transmitting, with the server, data associated with the route update over a network; and receiving, with one or more client devices associated with one or more users, the data associated with the route update from the sever;

wherein access to the data associated with the route update is limited to a pre-authorized subset of the one or more users associated with the tracking account, the subset of the one or more users being authorized to access data for the assigned route and the vehicle and restricted from accessing data for at least one other route and/or vehicle.

14. The method of claim 13, wherein the assigned route comprises two or more predefined stops.

15. The method of claim 13, further comprising implicitly defining the assigned route by:

receiving, with a processor, a plurality of the location updates from the mobile device; and recording, with the processor, the assigned route based on the plurality of location updates.

16. The method of claim 15, wherein the assigned route is recorded based on the mobile device's motion patterns over a period of time.

17. The method of claim 16, wherein the mobile device's motion patterns are determined using a set of the plurality of the location updates received at least a first time interval apart from one another.

18. The method of claim 16, wherein the mobile device's motion patterns are determined using a set of the plurality of the location updates determined to be on different streets from one another.

19. The method of claim 15, wherein the assigned route is recorded based on the mobile device's stopping patterns over a period of time.

20. The method of claim 19, wherein the mobile device's stopping patterns are determined using a set of the plurality of the location updates received at least a second time interval apart from one another.

21. The method of claim 19, wherein the mobile device's stopping patterns are determined using a set of the plurality of the location determined to be at least a first distance from one another.

22. The method of claim 13, further comprising:

sending, with the one or more client devices or the server, a request to a provider to translate the location update into an estimated time of arrival at a location for the mobile device; and receiving, with the one or more client devices or the server, the estimated time of arrival.

23. The method of claim 22, wherein the location is one of at least one user defined favorite locations.

24. The method of claim 22, further comprising sharing, with the one or more client devices, data associated with the location update, the route update, and/or the estimated time of arrival with at least one other one of the one or more client devices over a network.

25. The system of claim 1, wherein the subset of the one or more users is authorized to access data for a subset of stops within the assigned route and restricted from accessing data for at least one other of the stops within the assigned route.

26. The method of claim 13, wherein the subset of the one or more users is authorized to access data for a subset of stops within the assigned route and restricted from accessing data for at least one other of the stops within the assigned route.

* * * * *